UNITED STATES PATENT OFFICE.

PAUL THOMASCHEWSKI, OF VOHWINKEL, NEAR ELBERFELD, GERMANY, ASSIGNOR TO FARBENFABRIKEN VORM. FRIEDR. BAYER & CO., OF ELBERFELD, GERMANY, A CORPORATION OF GERMANY.

VAT DYE.

1,076,329.  Specification of Letters Patent.  Patented Oct. 21, 1913.

No Drawing.   Application filed August 22, 1912.   Serial No. 716,472.

*To all whom it may concern:*

Be it known that I, PAUL THOMASCHEWSKI, doctor of philosophy, chemist, citizen of the German Empire, residing at Vohwinkel, near Elberfeld, Germany, have invented new and useful Improvements in Vat Dye, of which the following is a specification.

I have found that new thiazins (dianthraquinonylthiazins)

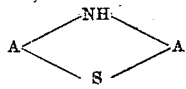

(A being an anthraquinon radical containing the sulfur substituted in the 2-2'-positions and the nitrogen in the 1-1'-positions) which are valuable vat dyestuffs, can be obtained by condensing ortho-halogenized aminoanthraquinones with anthraquinone mercaptans or by condensing ortho-aminoanthraquinone-mercaptans with halogenized anthraquinones and oxidizing if necessary the resulting products. The new compounds are from violet to blue crystalline powders soluble in quinolin generally with a blue coloration. They dissolve in concentrated sulfuric acid with a green coloration and dye cotton from the hydrosulfite vat from violet to blue fast shades.

In order to illustrate the new process more fully the following example is given, the parts being by weight:—A mixture of 6 parts of 1-amino-2-bromoanthraquinone, 5 parts of anthraquinone-2-mercaptan and 2 parts of $CO_3K_2$ is heated to boiling with 80 parts of nitrobenzene during 6 hours. The dye is filtered off, washed with alcohol and water and dried. It crystallizes from quinolin in the shape of blue needles. It dyes cotton reddish-blue shades. It has the following graphically represented formula

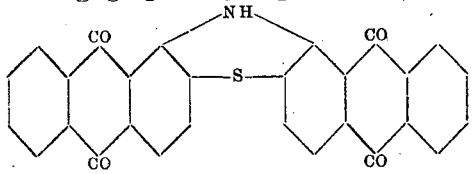

I claim:—

1. The herein described dianthraquinonylthiazins having most probably the formula:

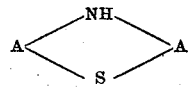

in which formula A represents anthraquinone radicals substituted by sulfur in the 2-2'-positions and by the nitrogen in the 1-1'-positions which are from violet to blue crystalline powders soluble in quinolin generally with a blue coloration; being soluble in concentrated sulfuric acid with a green coloration; and dyeing cotton from the hydrosulfite vat fast blue shades, substantially as described.

2. The herein described dianthraquinonylthiazin having the following graphically represented formula:

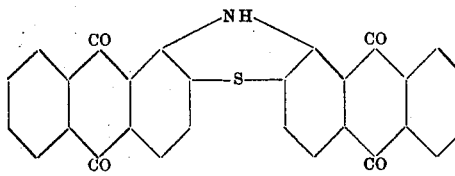

which is a blue crystalline powder soluble in quinolin, soluble in concentrated sulfuric acid with a green coloration, and dyeing cotton reddish-blue shades, substantially as described.

In testimony whereof I have hereunto set my hand in the presence of two subscribing witnesses.

PAUL THOMASCHEWSKI.

Witnesses:
 HELEN NUFER,
 ALBERT NUFER.